Patented Dec. 4, 1945

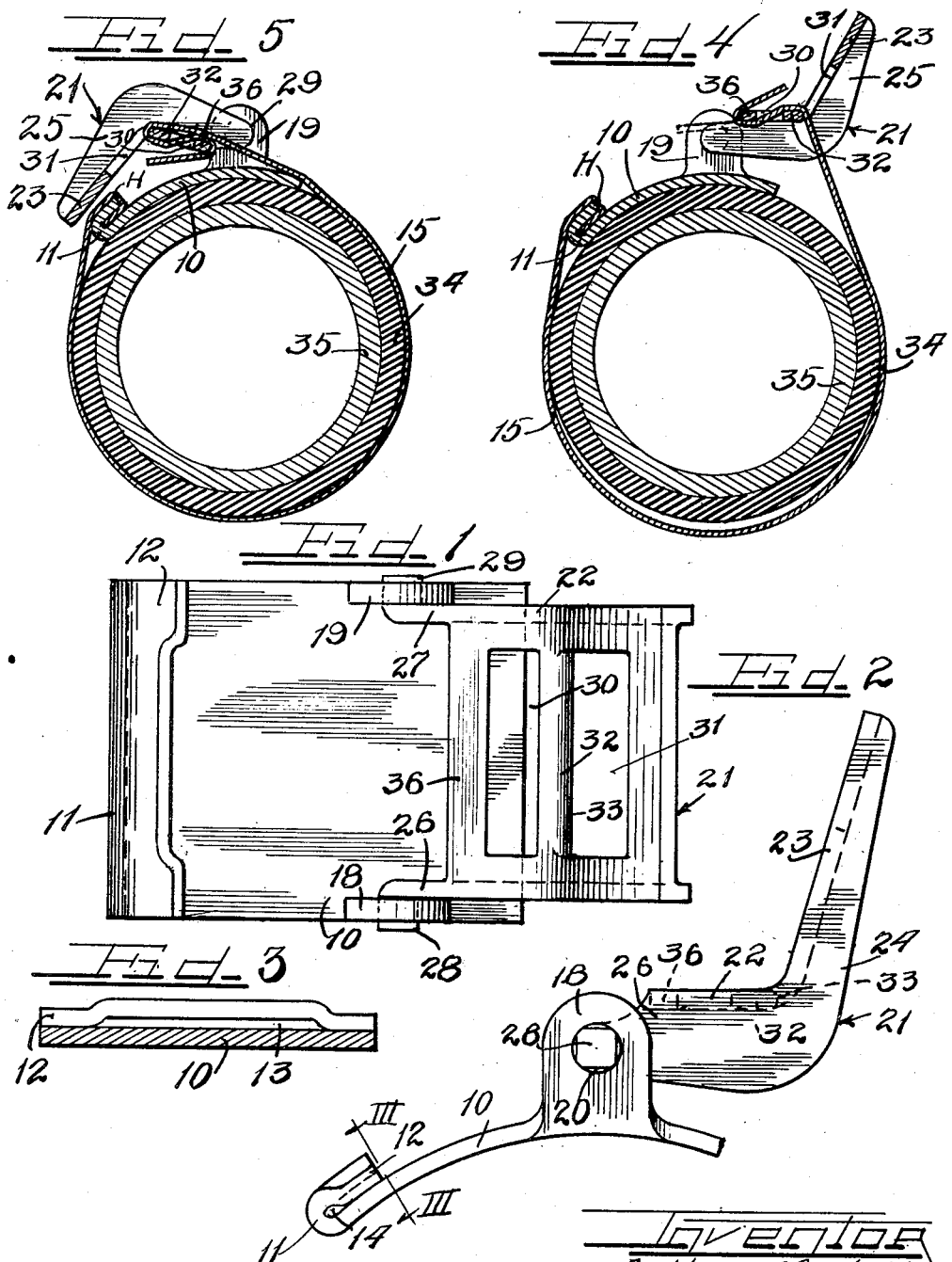

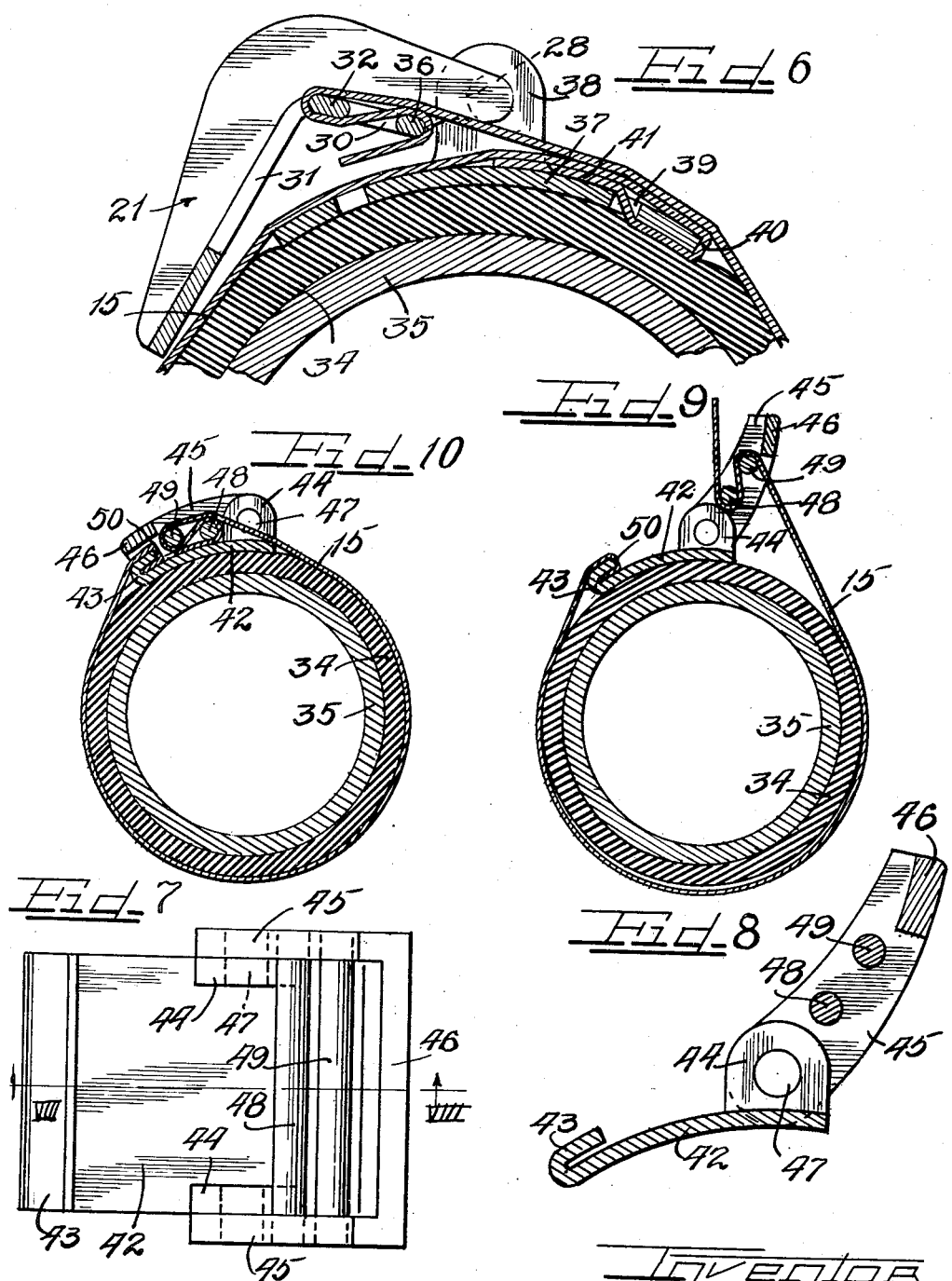

2,390,232

UNITED STATES PATENT OFFICE 2,390,232

CLAMP

Anthony Venditty, Detroit, Mich., assignor to Thompson Products, Inc., Cleveland, Ohio, a corporation of Ohio Application September 3, 1943, Serial No. 501,109

2 Claims. (Cl. 24—19)

My invention relates to clamping devices adapted particularly for clamping structures, such as hose, to hose couplings or fittings.

An important object of the invention is to provide a clamping device comprising two clamping members hinged together, with one of the members having the end of a clamping band secured thereto, and the other member, when in open position, adjustably receiving the other end of the band, and which other member, when swung to a closed position, drawing the band tightly around the hose and then being automatically locked in such clamping position.

A further object of this invention is to provide a clamping device in which the two band receiving members may each be formed integral of sheet metal.

A further object of the invention is to provide a clamping device comprising a base member having edges for frictionally engaging and securing one end of a band, and a tensioning member hinged to the base member and provided with a plurality of surfaces around which the other end of the band is drawn while said hinged member is in open position to effect preliminary setting of the band around the hose, and with such surfaces then bending said other end of the band into friction engagement with the hinged member as the hinged member is swung into closed position for tightening the band around the hose.

My invention also incorporates other features of construction and arrangement, and all the various features of my invention are embodied in the drawings, in which:

Figure 1 is a plan view of the two clamping device members;

Figure 2 is a side elevation thereof;

Figure 3 is a section on plane III—III of Figure 2;

Figure 4 is a cross section of the clamping device, at reduced scale, applied around a hose, with the hinged member in open position and the band end adjusted therein preparatory for the clamping operation;

Figure 5 is a view like Figure 4 showing the device in clamping and locked position;

Figure 6 shows base and tensioning members substantially like those of Figures 1 to 5 but showing a modified hook connection of one end of the band with the base member;

Figure 7 is a plan view of base and tensioning members of modified shape;

Figure 8 is a longitudinal cross-sectional view taken along the line VIII—VIII of Figure 7;

Figure 9 shows the structure of Figures 7 and 8 applied to a hose with a band applied thereto preparatory to the clamping operation; and Figure 10 shows the tensioning member swung to clamping position.

The clamping device shown on Figures 1 to 5 comprises the base member 10 of arcuate form longitudinally to correspond with the mean curvature of the hoses or tubings which are to be clamped. This base portion is formed integral of suitable sheet metal, such as steel, and its outer portion is bent upwardly and back toward the top of the member to form a hook 11, the end portions 12 of which are deflected down against the top of the base member to leave an entrance 13 to the hook bend 14 of a width just slightly greater than the width of the metal band or clamping strap 15.

Adjacent to its inner end, the base member has upstanding opposed ears 18 and 19 deflected therefrom, these ears having trunnion openings 20 therethrough.

The hinged tensioning member 21 is formed integral of sheet metal and comprises the body part 22 and the part 23 extending at an angle therefrom. Strengthening flanges 24 and 25 extend from the sides of the parts 22 and 23 with the inner ends 26, 27 of the flanges projecting inwardly beyond the part 22 and with the ends of these extensions deflected outwardly and formed to provide trunnions 28 and 29 respectively for engaging in the trunnion openings 20 of the ears 18 and 19, the member 21 being thus hinged or fulcrumed to the base member 10. In order that the trunnions may be inserted into the trunnion openings, the ears are primarily bent laterally outwardly sufficiently for alignment of the trunnions with the trunnion openings, and then the ears are bent to form right angles with the base 10 to receive the trunnions in the trunnion openings.

The body portion 22 of the hinged or tensioning member 21 has near its inner edge a transverse slot 30, and in the angular part 23 of the hinged member a transverse slot 31 is provided which terminates at the bend between the parts 22 and 23, these slots leaving the outer and inner cross bar portions 32 and 36 on the tensioning member. These two slots are of a length just slightly greater than the width of the clamping band 15. The portion 32 of the hinged member part 22 between the slots 30 and 31 has its outer edge 33 rounded.

Figures 4 and 5 show how the clamping band 15 is secured to the base and tensioning members. One end of the band is inserted into the slot 13 and the band then bent over the hook 11 of the base to form a hook H on the end of the band. The band is then wrapped around the hose 34 which is to be clamped to a fitting 35. The tensioning member 21 is primarily open and the other end of the band 15 is passed upwardly through the slot 31 and then around the cross bar 32 and through the slot 30 to extend outwardly below the cross bar 36 as indicated by the dotted lines on Figure 4. The rounded edge 33 on the cross bar 32 allows the band to be readily pulled through the slots for preliminary setting of the band 15 preparatory to the final clamping thereof around the hose. After such preliminary setting the end of the band may be deflected around the cross bar 36 in order to more securely anchor the band end to the tensioning member before the member is moved to its closed position. When the member is swung to its closed position the band will loop around the edge 33 as the band is being tightly drawn around the hose and against the end of the band which is deflected around the cross bar 36. When the hinged member is in a fully closed position, as shown in Figure 5, the pull of the band on the tensioning member on the cross bar 32 will be in a line inside the fulcrum axis of the member and the member will therefore be locked in closed position with the end of its angle part 23 resting against the hook end of the band which engages the hook 11 of the base member 10.

In my improved clamping device, the two clamping band engaging members are each in the form of an integral structure readily stamped and formed of sheet metal. The clamping band is merely a length of ordinary stock band or ribbon of steel or other suitable metal and no riveting or special securing means are necessary for securing the band to the base member or the hinged member of the clamp. The end of the band is applied to the tensioning member for preliminary adjustment thereon for the desired clamping tension when the member is swung around into closed position.

In the arrangement of Figure 6, the base member 37 has ears 38 extending outwardly therefrom apertured to receive the trunnions 28 of the tensioning member 21. Adjacent to its outer end, the base member has a cross slot 39 therethrough whose length is just a trifle longer than the width of the clamping band 15. The end portion of the band is bent in the form of hook 40 for engaging around the outer edge of the base member, the end 41 of the hook being passed outwardly through the slot 39 and then inwardly along the top of the base member, the free end of the band being then drawn over the outer side of the base member against the hook end 41 and is swung around the hose or tubing 34 for attachment to the clamping member 21. The free end of the band is threaded through the slots 31 and 30 and around the bar portions 30 and 32 of the clamping member when the clamping member is in open position, in the same manner as shown and described in connection with Figure 4. When the clamping member is now swung to its closed position, the band 15 will be drawn tightly around the hose and against the outer side of the hook formation 40, and when the clamping member is in its fully closed position, the tension line of the band will be inside of the fulcrum axis of the tensioning member so that this member will be automatically locked in its closed clamping position. The tensed band will also exert pressure along and against the inner end of the base member so that the base member will be intimately held against the hose.

In the modified structure shown on Figures 7 to 10, the base member 42 has the hook 43 at its inner end and upstanding ears 44 adjacent to its outer end. The tensioning member comprises the arms or side plates 45 connected at their outer ends by a cross bar 46. The ears 44 and the arms 45 are apertured for reception of hinge pins 47. Extending between the side arms 45 and secured thereto are inner and outer cross bars or pins 48 and 49, these performing the same function as the cross bar portions 32 and 36 in the structures of Figures 1 to 6.

One end of the clamping band 15 is formed into a hook 50 for engaging the hook 43 on the inner end of the base member 42, the band being then applied around the hose 34 for connection of its free end with the tensioning member. The application of the band end to the tensioning member is shown on Figure 9, the procedure being substantially the same as that shown in connection with Figures 1 to 6. The band end is first carried around the outer side of the bar 49, then inwardly between the bars and around the inner bar 48. When the tensioning member is now swung toward its closed position as shown on Figure 10, the band is drawn tightly around the hose, and when the tensioning member is in fully closed position the pull thereby on the end of the band connected thereto will be in a line inside of the fulcrum axis of the tensioning member and the member will be automatically held locked in its closed or clamping position, as shown on Figure 10. The end of the band connected with the tensioning member will then press against the outer end of the base member 42 and the pull of the other end of the band on the hook end of the base member will hold this end intimately against the hose. The cross bar 46 at the outer end of the tensioning member will be disposed over the hook ends of the base member and band, and by the insertion of a suitable tool under this cross bar the clamping structure may be readily opened.

I have shown a practical and efficient embodiment of the features of my invention but I do not desire to be limited to the exact construction and arrangement shown and described, as changes and modifications may be made without departing from the scope of the invention.

I claim as follows:

1. A hose clamp device comprising a base adapted at one end to retain one end of a clamping band, and a tensioning member pivoted on said base adjacent the outer end thereof to be swung to open position away from the base or into closed position against the outer side of the base, said member having fixed outer and inner spaced apart cross bars at one side of its pivot axis and lying in a plane which, when the clamp is in closed position, is between the pivot and base and around which bars the other end of the band may be threaded in such manner while said member is in open position that when said member is swung into closed position for tensioning of the band said other end of the band adjacent to said tensioning member will intimately surround the outer cross bar and will overlap with pressure engagement the band portion extending around the inner cross bar to hold this band portion intimately to the inner cross bar.

2. A hose clamping device comprising a base adapted at one end to retain one end of a clamping band, a clamping lever pivoted on said base adjacent to the other end thereof to be swung to open position away from the base or into closed position against the outer side of the base, said lever having fixed outer and inner spaced apart cross bars at one side of its pivot axis and lying in a plane which, when the clamp is in closed position, is between the pivot and base and around which bars the other end of the band may be threaded, while said lever is in open position, to extend first outwardly through the space outwardly of the outer cross bar and then around the outer side of said outer cross bar, and then through the space between said cross bars and outwardly around said inner cross bar whereby, when said lever is swung into closed position for tensioning of the band, said other end of the band adjacent to said lever will intimately surround said outer cross bar and will overlap with pressure engagement the band portion extending around the inner cross bar to hold said band portion intimately to the inner cross bar, said lever being provided at its end opposite the pivot with a stop portion limiting closing movement of the clamp by engagement with the first mentioned retained end of said band.

ANTHONY VENDITTY.